United States Patent
Kala et al.

(10) Patent No.: US 11,295,310 B2
(45) Date of Patent: Apr. 5, 2022

(54) METHOD, SYSTEM, AND COMPUTER PROGRAM PRODUCT FOR FRAUD DETECTION

(71) Applicant: Visa International Service Association, San Francisco, CA (US)

(72) Inventors: Durga Kala, Cupertino, CA (US); Tathagata Sengupta, Bangalore (IN); Debabrata Chowdhury, Foster City, CA (US); Juharasha Shaik, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 65 days.

(21) Appl. No.: 16/781,034

(22) Filed: Feb. 4, 2020

(65) Prior Publication Data

US 2021/0241278 A1 Aug. 5, 2021

(51) Int. Cl.
*G06Q 20/40* (2012.01)
*G06Q 50/26* (2012.01)

(52) U.S. Cl.
CPC ....... *G06Q 20/4016* (2013.01); *G06Q 50/265* (2013.01)

(58) Field of Classification Search
CPC ... G06Q 40/00; G06Q 20/4015; G06Q 50/265
USPC .......................................................... 705/35
See application file for complete search history.

(56) References Cited

U.S. PATENT DOCUMENTS

| | | | |
|---|---|---|---|
| 6,658,393 B1 | 12/2003 | Basch et al. | |
| 9,842,336 B2 | 12/2017 | Liu et al. | |
| 2002/0099649 A1* | 7/2002 | Lee | G06Q 20/4016 |
| | | | 705/38 |
| 2006/0285665 A1 | 12/2006 | Wasserblat et al. | |
| 2007/0119919 A1 | 5/2007 | Hogg et al. | |
| 2009/0030710 A1 | 1/2009 | Levine | |

(Continued)

OTHER PUBLICATIONS

The Importance of the Retail Payment System. Hal S. Scott, Nomura Professor and Director, Program on International Financial Systems. Harvard Law School. Dec. 16, 2014 (Year: 2014).*

(Continued)

*Primary Examiner* — Alexander G Kalinowski
*Assistant Examiner* — John O Preston
(74) *Attorney, Agent, or Firm* — The Webb Law Firm

(57) ABSTRACT

A method, system, and computer program product for fraud detection receive transaction data associated with a plurality of transactions; determine, based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions.

9 Claims, 10 Drawing Sheets

(56) References Cited

U.S. PATENT DOCUMENTS

| | | |
|---|---|---|
| 2010/0325035 A1 | 12/2010 | Hilgers et al. |
| 2011/0218909 A1 | 5/2011 | Collins |
| 2014/0180974 A1* | 6/2014 | Kennel ................ G06Q 40/025 706/12 |
| 2014/0188723 A1 | 7/2014 | Pacher et al. |
| 2014/0279306 A1 | 9/2014 | Shi et al. |
| 2015/0134512 A1 | 5/2015 | Mueller |
| 2016/0210633 A1 | 7/2016 | Epelman et al. |
| 2016/0364727 A1* | 12/2016 | DeLawter .......... G06Q 20/4014 |

OTHER PUBLICATIONS

The Laws, Regulations, and Industry Practices That Protect Consumers Who Use Electronic Payment Systems: Credit and Debit Cards. Mark Furletti, Stephen Smith. Federal Reserve Bank of Philadelphia. (Year: 2005).*

M. A. Ali, B. Arief, M. Emms and A. van Moorsei, "Does the Online Card Payment Landscape Unwittingly Facilitate Fraud?," in IEEE Security & Privacy, vol. 15, No. 2, pp. 78-86, Mar.-Apr. 2017, doi: 10.1109/MSP.2017.27. (Year: 2017).*

Correia et al., "Industry Paper: The Uncertain Case of Credit Card Fraud Detection", DEBS'15, 2015, pp. 181-192.

Bolton et al., "Statistical Fraud Detection: A Review", Statistical Science, 2002, pp. 235-255, vol. 17, No. 3.

* cited by examiner

400

420
Receive in-network transaction data associated with an in-network transaction processed in transaction processing network →

Transaction Service Provider System
408

425
Receive out-of-network transaction data associated with an out-of-network transaction processed outside of the transaction network ⟶

Transaction Service Provider System
408

FIG. 4B

| Transaction Service Provider System 408 |

430
Determine, based on the in-network transaction data and the out-of-network transaction data, that each of the in-network transaction and the out-of-network transaction associated with the same account identifier include a value for a same at least one transaction parameter

```
                                                                    ┌─ 400
                                                                   ↙
┌──────────┐
│Transaction│        ⤺      435
│ Service  │        ⤸   Determine a difference between the values
│ Provider │
│ System   │
│   408    │
└──────────┘
```

FIG. 4D

440
Determine, based on the difference, whether the in-network transaction and the out-of-network transaction are fraudulent transactions

METHOD, SYSTEM, AND COMPUTER PROGRAM PRODUCT FOR FRAUD DETECTION

BACKGROUND

1. Field

This disclosure relates generally to methods, systems, devices, products, and apparatus that are used for fraud detection, and in some embodiments or aspects, to a method, a system, and a product for fraud detection using a combination of in-network and out-of-network transactions.

2. Technical Considerations

Customized fraud rules are used to identify legitimate transactions from fraudulent transactions. A decision criterion may be embedded in a fraud rule to take further action with respect to a transaction identified as fraudulent. The validity or effectiveness of customized rules may be tested against actual transactional data. Issuer systems may be notified about the accounts involved in a potentially fraudulent transaction, as well as various features of a payment card that may have been compromised (e.g., a PIN, a CVV, personal information of a cardholder, etc.), and the issuer systems may take further action based thereon.

An issuer system may enroll its bank identification number (BIN) and/or account ranges with a transaction service provider system or payment network to create and implement fraud rules based on transaction patterns associated with the issuer system. The transaction service provider system or payment network may receive transactions that include account identifiers including the BIN (and/or included within the account ranges) and take action based on the fraud rules (e.g., approve transactions, decline transactions, generate alerts, etc.), and the issuer system may view the transactions and mark the transactions as fraudulent or legitimate.

However, a transaction service provider system or payment network may not be present as a payment processing provider in certain geographic locations, which may result in third party providers processing transactions in those geographic locations on behalf of the transaction service provider system or payment network. For example, a transaction service provider system or payment network may not have an overall view of fraud happening across various regions, countries, and/or continents, and fraud detection rules/systems may be region specific and payment network specific. As an example, there are many countries or organizations which cannot afford certain transaction service provider systems, and issuer systems may have a lack of visibility on current trending of fraudulent transactions, because there may be no way to determine fraudulent transactions for transactions that occur outside the transaction service provider system or payment network and that are processed by third party providers. Accordingly, unless a fraud has occurred with the transaction service provider system or payment network in a specific region, fraud detection rules/systems are unable to analyze the transactions and take corresponding action.

SUMMARY

Accordingly, provided are improved methods, systems, devices, products, and/or apparatus for fraud detection.

According to some non-limiting embodiments or aspects, provided is a computer-implemented method, including: receiving, with at least one processor, transaction data associated with a plurality of transactions; determining, with at least one processor, based on the transaction data, that two or more consecutive transactions associated with a same account identifier include a value for a same at least one transaction parameter; in response to determining that each of the two or more consecutive transactions associated with the same account identifier include the value for the same at least one transaction parameter, determining, with at least one processor, a difference between the value for the at least one transaction parameter associated with a first transaction of the two or more consecutive transactions and the value for the at least one transaction parameter associated with a second transaction of the two or more consecutive transactions; and determining, with at least one processor, based on the difference, that the two or more consecutive transactions are fraudulent transactions.

According to some non-limiting embodiments or aspects, provided is a computing system including: one or more processors programmed and/or configured to: receive transaction data associated with a plurality of transactions; determine based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine, a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions.

According to some non-limiting embodiments or aspects, provided is a computer program product including at least one non-transitory computer-readable medium including program instructions that, when executed by at least one processor, cause the at least one processor to: receive transaction data associated with a plurality of transactions; determine based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine, a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions.

In some non-limiting embodiments or aspects, the transaction data includes in-network transaction data associated with at least one in-network transaction processed in a transaction processing network and out-of-network transaction data associated with at least one out-of-network transaction processed outside of the transaction processing network.

In some non-limiting embodiments or aspects, the in-network transaction data is received from a transaction service provider system inside the transaction processing network, and wherein the out-of-network transaction data is received from at least one of a merchant system outside of the transaction processing network and an issuer system outside of the transaction processing network.

In some non-limiting embodiments or aspects, the first transaction includes the at least one out-of-network transaction, and wherein the second transaction includes the at least one in-network transaction.

In some non-limiting embodiments or aspects, in response to determining that the out-of-network transaction and the in-network transaction are fraudulent transactions, authorization of the in-network transaction processed in the transaction processing network is denied.

In some non-limiting embodiments or aspects, in response to determining that the out-of-network transaction and the in-network transaction are fraudulent transactions, a notification is provided to an issuer system associated with the out-of-network transaction, wherein the notification includes an indication that the out-of-network transaction is a fraudulent transaction.

In some non-limiting embodiments or aspects, the at least one transaction parameter includes at least one of the following: a geographic location, a merchant category code (MCC), a transaction time, a transaction amount, or any combination thereof.

Further embodiments or aspects are set forth in the following numbered clauses:

Clause 1. A computer-implemented method, comprising: receiving, with at least one processor, transaction data associated with a plurality of transactions; determining, with at least one processor, based on the transaction data, that two or more consecutive transactions associated with a same account identifier include a value for a same at least one transaction parameter; in response to determining that each of the two or more consecutive transactions associated with the same account identifier include the value for the same at least one transaction parameter, determining, with at least one processor, a difference between the value for the at least one transaction parameter associated with a first transaction of the two or more consecutive transactions and the value for the at least one transaction parameter associated with a second transaction of the two or more consecutive transactions; and determining, with at least one processor, based on the difference, that the two or more consecutive transactions are fraudulent transactions.

Clause 2. The computer-implemented method of clause 1, wherein the transaction data includes in-network transaction data associated with at least one in-network transaction processed in a transaction processing network and out-of-network transaction data associated with at least one out-of-network transaction processed outside of the transaction processing network.

Clause 3. The computer-implemented method of clauses 1 or 2, wherein the in-network transaction data is received from a transaction service provider system inside the transaction processing network, and wherein the out-of-network transaction data is received from at least one of a merchant system outside of the transaction processing network and an issuer system outside of the transaction processing network.

Clause 4. The computer-implemented method of any of clauses 1-3, wherein the first transaction includes the at least one out-of-network transaction, and wherein the second transaction includes the at least one in-network transaction.

Clause 5. The computer-implemented method of any of clauses 1-4, further comprising: in response to determining that the out-of-network transaction and the in-network transaction are fraudulent transactions, denying, with at least one processor, authorization of the in-network transaction processed in the transaction processing network.

Clause 6. The computer-implemented method of any of clauses 1-5, further comprising: in response to determining that the out-of-network transaction and the in-network transaction are fraudulent transactions, providing, with at least one processor, a notification to an issuer system associated with the out-of-network transaction, wherein the notification includes an indication that the out-of-network transaction is a fraudulent transaction.

Clause 7. The computer-implemented method of any of clauses 1-6, wherein the at least one transaction parameter includes at least one of the following: a geographic location, a merchant category code (MCC), a transaction time, a transaction amount, or any combination thereof.

Clause 8. A computing system comprising: one or more processors programmed and/or configured to: receive transaction data associated with a plurality of transactions; determine based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine, a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions.

Clause 9. The computing system of clause 8, wherein the transaction data includes in-network transaction data associated with at least one in-network transaction processed in a transaction processing network and out-of-network transaction data associated with at least one out-of-network transaction processed outside of the transaction processing network.

Clause 10. The computing system of clauses 8 or 9, wherein the in-network transaction data is received from a transaction service provider system inside the transaction processing network, and wherein the out-of-network transaction data is received from at least one of a merchant system outside of the transaction processing network and an issuer system outside of the transaction processing network.

Clause 11. The computing system of any of clauses 8-10, wherein the first transaction includes the at least one out-of-network transaction, and wherein the second transaction includes the at least one in-network transaction.

Clause 12. The computing system of any of clauses 8-11, wherein the one or more processors are further programmed and/or configured to: in response to determining that the out-of-network transaction and the in-network transaction are fraudulent transactions, deny authorization of the in-network transaction processed in the transaction processing network.

Clause 13. The computing system of any of clauses 8-12, wherein the one or more processors are further programmed and/or configured to: in response to determining that the out-of-network transaction and the in-network transaction are fraudulent transactions, provide a notification to an issuer system associated with the out-of-network transaction, wherein the notification includes an indication that the out-of-network transaction is a fraudulent transaction.

Clause 14. The computing system of any of clauses 8-13, wherein the at least one transaction parameter includes at least one of the following: a geographic location, a merchant category code (MCC), a transaction time, a transaction amount, or any combination thereof.

Clause 15. A computer program product comprising at least one non-transitory computer-readable medium including program instructions that, when executed by at least one processor, cause the at least one processor to: receive transaction data associated with a plurality of transactions; determine based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine, a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions.

Clause 16. The computer program product of clause 15, wherein the transaction data includes in-network transaction data associated with at least one in-network transaction processed in a transaction processing network and out-of-network transaction data associated with at least one out-of-network transaction processed outside of the transaction processing network.

Clause 17. The computer program product of clauses 15 or 16, wherein the in-network transaction data is received from a transaction service provider system inside the transaction processing network, and wherein the out-of-network transaction data is received from at least one of a merchant system outside of the transaction processing network and an issuer system outside of the transaction processing network.

Clause 18. The computer program product of any of clauses 15-17, wherein the first transaction includes the at least one out-of-network transaction, and wherein the second transaction includes the at least one in-network transaction.

Clause 19. The computer program product of any of clauses 15-18, wherein the instructions further cause the at least one processor to: in response to determining that the out-of-network transaction and the in-network transaction are fraudulent transactions, denying, with at least one processor, authorization of the in-network transaction processed in the transaction processing network.

Clause 20. The computer program product of any of clauses 15-19, wherein the instructions further cause the at least one processor to: in response to determining that the out-of-network transaction and the in-network transaction are fraudulent transactions, providing, with at least one processor, a notification to an issuer system associated with the out-of-network transaction, wherein the notification includes an indication that the out-of-network transaction is a fraudulent transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which:

FIGS. 4A-4G are diagrams of an implementation of a non-limiting embodiment or aspects of a process disclosed herein.

DESCRIPTION

Figure 1:
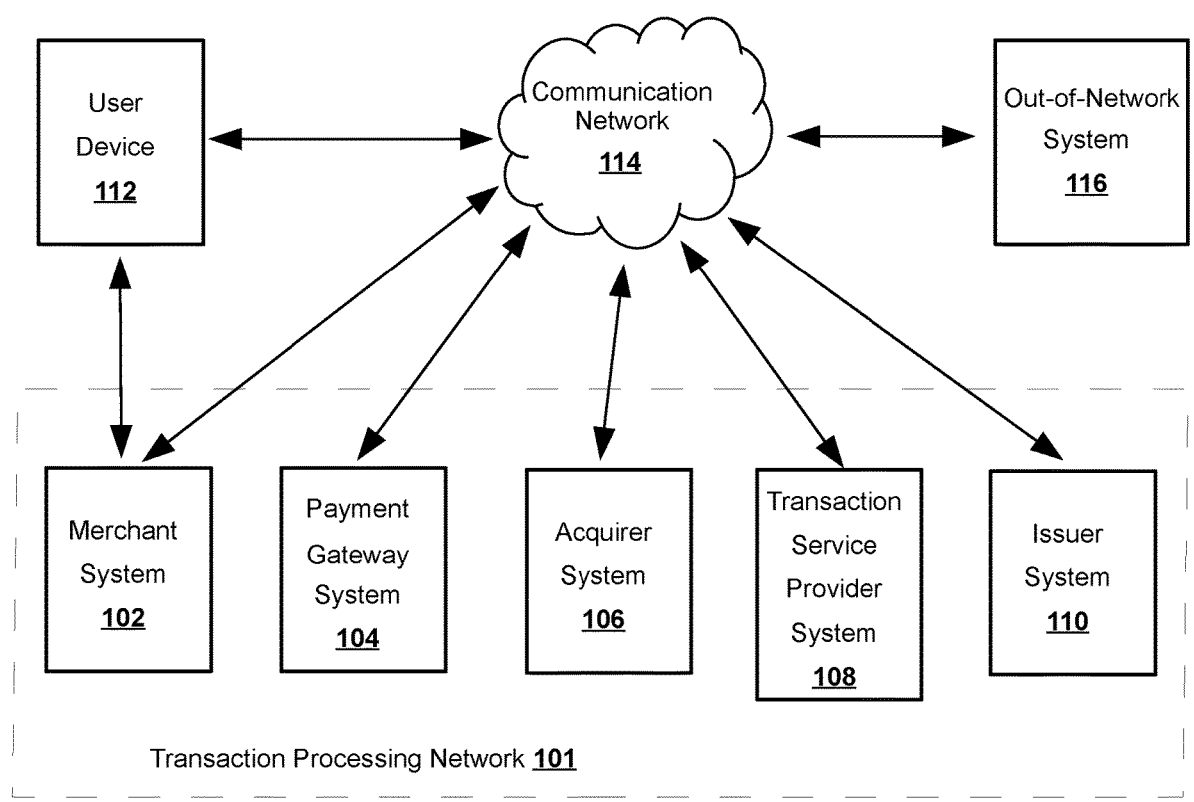
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for fraud detection.

Non-limiting embodiments or aspects of the present disclosure are directed to methods, systems, and computer program products for fraud detection that receive transaction data associated with a plurality of transactions; determine, based on the transaction data, that two or more consecutive transactions associated with a same account identifier include a value for a same at least one transaction parameter; in response to determining that each of the two or more consecutive transactions associated with the same account identifier include the value for the same at least one transaction parameter, determine a difference between the value for the at least one transaction parameter associated with a first transaction of the two or more consecutive transactions and the value for the at least one transaction parameter associated with a second transaction of the two or more consecutive transactions; and determine, based on the difference, that the two or more consecutive transactions are fraudulent transactions. For example, the transaction data may include in-network transaction data associated with at least one in-network transaction processed in a transaction processing network and out-of-network transaction data associated with at least one out-of-network transaction processed outside of the transaction processing network. In this way, non-limiting embodiments or aspects of the present disclosure provide for receiving real-time feeds of in-network transactions and out-of-network transactions and processing both in parallel to determine fraud in consecutive transactions, which enables consolidating fraud patterns irrespective of a transaction service provider system or payment network that processes the transactions, the transactions to be analyzed and fraud to be mitigated in other regions where similar fraud has not yet taken place, and publishing fraud detection rules across other regions before a same fraud pattern can be repeated in the new region across various other network processors.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, and/or issuer system 110, user device 112, communication network 114, and/or out-of-network system 116. Transaction processing network 101, merchant system 102, payment gateway system 104, acquirer system 106, transaction service provider system 108, issuer system 110, user device 112, and/or out-of-network system 116 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, user device 112, and/or out-of-network system 116 (e.g., via communication network 114, etc.) and/or communicating information and/or data to payment gateway system 104, acquirer system 106, transaction service provider system 108, issuer system 110, user device 112, and/or out-of-network system 116 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, user device 112, and/or out-of-network system 116 (e.g., via communication network 114, etc.) and/or communicating information and/or data to merchant system 102, acquirer system 106, transaction service provider system 108, issuer system 110, user device 112, and/or out-of-network system 116 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, user device 112, and/or out-of-network system 116 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, user device 112, and/or out-of-network system 116 (e.g., via communication network 114, etc.) and/or communicating information and/or data to merchant system 102, payment gateway system 104, acquirer system 106, issuer system 110, user device 112, and/or out-of-network system 116 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more one or more internal and/or external databases including transaction data, and/or the like.

Issuer system 110 may include one or more devices capable of receiving information and/or data from merchant system 102, payment gateway system 104, acquirer system 106, transaction service provider system 108, user device 112, and/or out-of-network system 116 (e.g., via communication network 114, etc.) and/or communicating information and/or data to merchant system 102, payment gateway system 104, acquirer system 106, transaction service provider system 108, user device 112, and/or out-of-network system 116 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, issuer system 110, and/or out-of-network system 116 (e.g., via communication network 114, etc.) and/or communicating information and/or data to merchant system 102, payment gateway system 104, acquirer system 106, transaction service provider system 108, issuer system 110, and/or out-of-network system 116 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Out-of-network system 116 may include one or more devices capable of receiving information and/or data from merchant system 102, payment gateway system 104, acquirer system 106, transaction service provider system 108, issuer system 110, and/or user device 112 (e.g., via communication network 114, etc.) and/or communicating information and/or data to merchant system 102, payment gateway system 104, acquirer system 106, transaction service provider system 108, issuer system 110, and/or user device 112 (e.g., via communication network 114, etc.). For example, out-of-network system 116 may include a computing device, such as a server, a group of servers, and/or other like devices. In some non-limiting embodiments or aspects, out-of-network system 116 is located outside transaction processing network 101. For example, out-of-network system 116 may be located outside a communication path for processing a transaction in transaction processing network 101. As an example, out-of-network system 116 may be associated with one or more electronic payment transactions processed (e.g., initiated, conducted, authorized, etc.) via a communication path (e.g., a communication path, a communication channel, a communication network, etc.) for processing an electronic payment transaction other than the communication path between or including merchant system 102, payment gateway system 104, acquirer system 106, transaction service provider system 108, and/or issuer system 110. In some non-limiting embodiments or aspects, out-of-network system 116 may be associated with an issuer institution as described herein. For example, out-of-network system 116 may be associated with an issuer institution that issued a payment account or instrument (e.g., a credit account, a debit account, a credit card, a debit card, etc.) to a user (e.g., a user associated with user device 112, etc.). In some non-limiting embodiments or aspects, out-of-network system 116 may be associated with a merchant as described herein. In some non-limiting embodiments or aspects, out-of-network system 116 may include one or more devices, such as computers, computer systems, and/or peripheral devices capable of being used by a merchant to conduct a payment transaction with a user. For example, out-of-network system 116 may include a POS device and/or a POS system.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
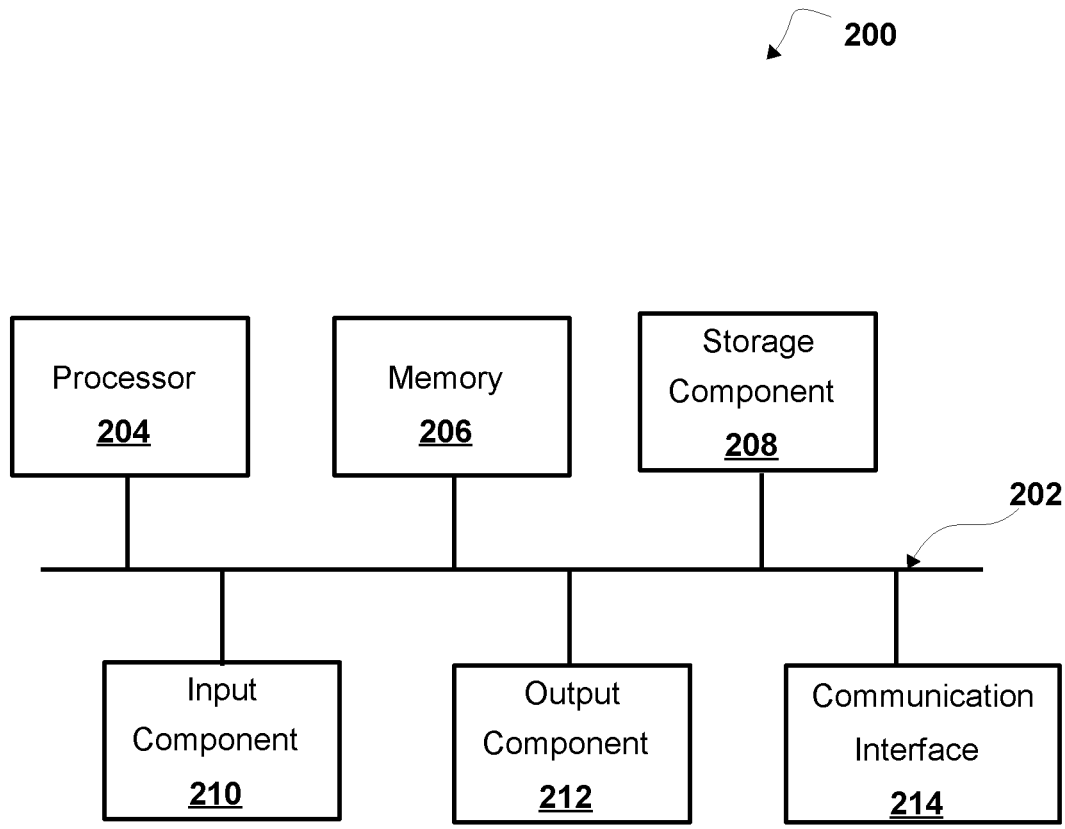
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.) and/or outside of transaction processing network 101, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
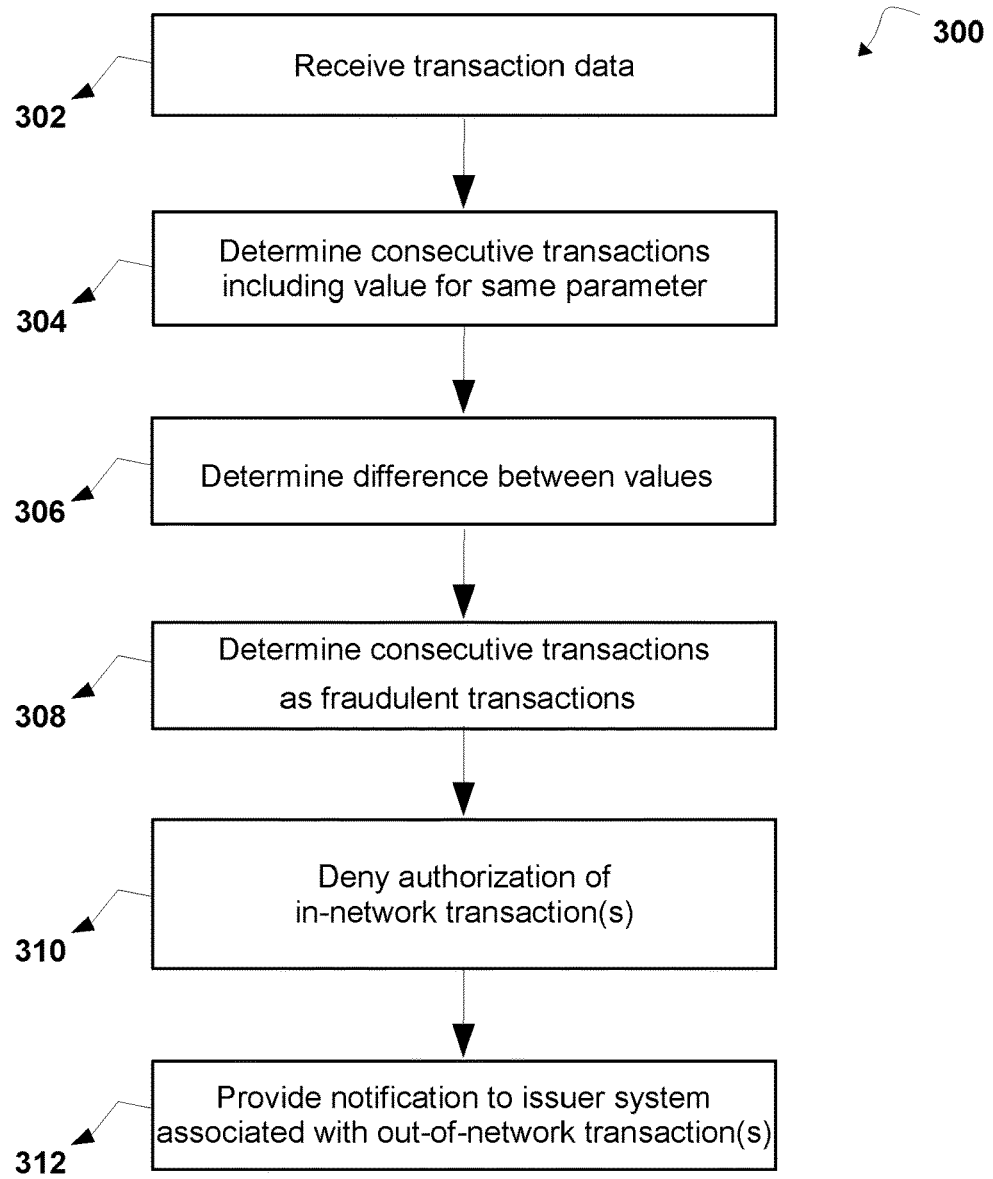
FIG. 3 is a flowchart of non-limiting embodiments or aspects of a process for co-located merchant anomaly detection.

Referring now to FIG. 3, FIG. 3 is a flowchart of non-limiting embodiments or aspects of a process 300 for co-located merchant anomaly detection. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes receiving transaction data. For example, transaction service provider system 108 may receive transaction data. As an example, transaction service provider system 108 may receive transaction data associated with a plurality of transactions.

In some non-limiting embodiments or aspects, transaction data may include parameters associated with a transaction, such as an account identifier (e.g., a PAN, etc.), a transaction amount, a transaction date and/or time, a type of products and/or services associated with the transaction, a conversion rate of currency, a type of currency, a merchant type, a merchant name, a merchant location, a merchant, a merchant category group (MCG), a merchant category code (MCC), an AA score, a card acceptor identifier, a card acceptor country/state/region, and/or the like. In such an example, MCGs may include general categories under which MCCs fall, such as Travel, Lodging, Dining and Entertainment, Vehicle Expenses, Office Services and Merchandise, Cash Advance, Other, and/or the like. In such an example, an MCC is a four-digit number listed in ISO 18245 for retail financial services used to classify a business by the types of goods or services it provides.

In some non-limiting embodiments or aspects, transaction data may include in-network transaction data associated with at least one in-network transaction processed in transaction processing network 101 and/or out-of-network transaction data associated with at least one out-of-network transaction processed outside of transaction processing network 101. For example, transaction service provider system 108 may receive in-network transaction data associated with an in-network transaction processed in transaction processing network 101 (e.g., via a real-time feed as the transactions are processed in-network, etc.) and/or out-of-network transaction data associated with an out-of-network transaction processed outside of transaction processing network 101 (e.g., via a real-time feed as the transactions are processed out-of-network, etc.). As an example, in-network transaction data may be received at or from a transaction service provider system 108 inside transaction processing network 101 (e.g., via merchant system 102, payment gateway 104, and/or acquirer system 106), and out-of-network transaction data may be received from out-of-network system 116 (e.g., from at least one of a merchant system outside of transaction processing network 101 and an issuer system outside of the transaction processing network 101). In such an example, transaction service provider system 108 may receive out-of-network transaction data 108 from merchant systems and/or issuer systems via a secure transfer channel (e.g., via Connect:Direct, etc.), such as from a POS via a merchant system or from a POS via an issuer system.

In some non-limiting embodiments or aspects, an issuer system associated with transactions processed outside of transaction processing network 101 may enroll or register with transaction service provider system 108 to provide transaction service provider system 108 with out-of-network transaction data associated with out-of-network transactions processed outside of transaction processing network 101 and/or to receive fraud/potential fraud information and/or suggested fraud rules based on transactions and fraud patterns analyzed by transaction service provider system 108 as described herein below.

As shown in FIG. 3, at step 304, process 300 includes determining consecutive transactions including a value for a same parameter. For example, transaction service provider system 108 may determine consecutive transactions including a value for a same parameter. As an example, transaction service provider system 108 may determine, based on the transaction data, that two or more consecutive transactions associated with a same account identifier (e.g., a same PAN, etc.) include a value for a same at least one transaction parameter. In such an example, consecutive transactions associated with a same account identifier may include a first transaction associated with an account identifier and a second transaction associated with the same account identifier that occurs directly after the first transaction (e.g., without another transaction associated with that same account identifier occurring between the first and second transactions and with zero or one or more other transactions associated with a different account identifier occurring between the first and second transactions). In such an example, the at least one transaction parameter may include any transaction parameter, such as at least one of the following: a geographic location, a merchant category code (MCC), a transaction time, a transaction amount, or any combination thereof.

In some-non-limiting embodiments or aspects, if two or more consecutive transactions associated with a same account identifier (e.g., a same PAN, etc.) do not include a value (e.g., a numerical value, a code, a time, an amount, etc.) for a same at least one transaction parameter, transaction service provider system 108 may not further analyze the two or more consecutive transactions for fraud. For example, if two or more consecutive transactions associated with a same account identifier (e.g., a same PAN, etc.) do include the value for the same at least one transaction parameter, transaction service provider system 108 may further analyze the two or more consecutive transactions for fraud based on the values for the same at least one transaction parameter. As an example, a single transaction may not be further analyzed for fraud without considering that single transaction in parallel with another transaction associated with the same account identifier, and if, between two consecutive transactions, one of the transactions does not include a value for the at least one transaction parameter, neither of the two consecutive transactions may be further analyzed for fraud. For example, between two consecutive transactions associated with the same account identifier, if both transactions include a value for the at least one transaction parameter, both transactions may be further analyzed for fraud.

In some non-limiting embodiments or aspects, an in-network transaction and the out-of-network transaction are consecutive transactions associated with a same account identifier. For example, the first transaction may include the at least one out-of-network transaction, and the second transaction may include the at least one in-network transaction. As an example, the second transaction may include the at least one out-of-network transaction, and the first transaction may include the at least one in-network transaction. In such an example, a cardholder may initiate one transaction processed within transaction processing network 101 and another transaction processed outside of transaction processing network 101.

As shown in FIG. 3, at step 306, process 300 includes determining a difference between values for a same parameter. For example, transaction service provider system 108 may determine a difference between values for a same parameter. As an example, transaction service provider system 108 may, in response to determining that each of the two or more consecutive transactions associated with the same account identifier include the value for the same at least one transaction parameter, determine a difference between the value for the at least one transaction parameter associated with a first transaction of the two or more consecutive transactions and the value for the at least one transaction parameter associated with a second transaction of the two or more consecutive transactions.

In some non-limiting embodiments or aspects, a difference between values for a same transaction parameter may include a difference between values for any transaction parameter, such as at least one of the following: a geographic location, a merchant category code (MCC), a transaction time, a transaction amount, an indication of a difference that satisfies a threshold difference, or any combination thereof. For example, a difference between values for a geographic location (e.g., a zip code, etc.) may include an absolute difference, an indication of the same or matching (full or partial match) geographic locations, an indication of different or non-matching geographic locations, a distance between geographic locations, an indication of a difference that satisfies a threshold difference, or any combination thereof. For example, a difference between values for a MCC may include an absolute difference, an indication of the same or matching (full or partial match) MCCs, an indication of different or non-matching MCCs, an indication of a difference that satisfies a threshold difference, or any combination thereof. For example, a difference between values for a transaction time may include an absolute difference, an indication of the same or matching times, an indication of times in a same time period, an indication of a difference that satisfies a threshold difference, or any combination thereof. For example, a difference between values for a transaction amount may include an absolute difference, an indication of a same or matching amount, an indication of a difference that satisfies a threshold difference, or any combination thereof.

As shown in FIG. 3, at step 308, process 300 includes determining consecutive transactions as fraudulent transactions. For example, transaction service provider system 108 may determine consecutive transactions as fraudulent transactions. As an example, transaction service provider system 108 may determine, based on the difference, that the two or more consecutive transactions are fraudulent transactions. In such an example, transaction service provider system 108 may compare the difference to at least one threshold and, if the difference satisfies the at least one threshold, determine that the two or more consecutive transactions are fraudulent transactions.

A first example of first and second consecutive transactions associated with a same account identifier analyzed for fraud by transaction service provider system 108 are discussed with respect to Table 1 below, which shows values of transaction parameters for the first and second transactions that are compared to determine whether the first and second transactions are fraudulent transactions.

TABLE 1

| 1st Transaction | | 2nd Transaction | | |
| --- | --- | --- | --- | --- |
| Scanning Element | Value | Scanning Element | Value | Decision |
| Transaction Amount | $70.00 | Transaction Amount | $70.00 | Fraud, same amount was deducted within |
| Transaction Time | 6 GMT | Transaction Time | 6.20 GMT | 20 minutes duration in same zip code area |
| MCC | 4500 | MCC | 4500 | and the MCC is of gas station. |
| Zip Code | 94404 | Zip Code (distance is less than 60 miles) | 94404 | |

As shown in Table 1, in a particular day, a card is swiped more than one time at gas stations for the first and second transactions having the same transaction amount, a transaction time difference between the two transactions is less than 30 minutes, an MCC code is the same for both transactions, and the distance difference between the gas stations is less than 60 miles (or the transaction happened in the same zip code area). This is an unlikely scenario that may be associated with fraud, because the same transaction amount occurring within 30 minutes and less than 60 miles of distance from different gas stations is very unlikely. Accordingly, transaction service provider system 108 may compare the differences in transaction amount, transaction time, MCC, and zip code for the first and second transactions associated with the same account identifier to predetermined thresholds or fraud rules associated therewith to determine that the first and second transactions are fraudulent transactions.

A second example of first and second consecutive transactions associated with a same account identifier analyzed for fraud by transaction service provider system 108 are discussed with respect to Table 2 below, which shows values of transaction parameters for the first and second transactions compared to determine whether the first and second transactions are fraudulent transactions.

TABLE 2

| 1st Transaction | | 2nd Transaction | | |
|---|---|---|---|---|
| Scanning Element | Value | Scanning Element | Value | Decision |
| Transaction Amount | $50.00 | Transaction Amount | $4000.00 | Fraud, same amount was deducted within 20 minutes duration in different zipcode area and the MCC is of grocery store. |
| Transaction Time | 6 GMT | Transaction Time | 6.20 GMT | |
| MCC | 3502 | MCC | 3505 | |
| Zip Code | 94404 | Zip Code (distance is more than 60 miles) | 94413 | |

As shown in Table 2, in a particular day, a card is swiped more than one time from the same MCC (e.g., the MCC for grocery store), having different transaction amounts, a transaction time between the two transactions is less than 30 minutes, and the distance between the stores is more than 60 miles (or the transaction happened in different zip code areas). This is an unlikely scenario that may be associated with fraud, because a cardholder is unlikely to purchase from grocery stores with huge differences in transaction amounts that are more than 60 miles apart within 30 minutes of time. Accordingly, transaction service provider system 108 may compare the differences in transaction amount, transaction time, MCC, and zip code for the first and second transactions associated with the same account identifier to predetermined thresholds or fraud rules associated therewith to determine that the first and second transactions are fraudulent transactions.

As shown in FIG. 3, at step 310, process 300 includes denying authorization of one or more in-network transactions. For example, transaction service provider system 108 may deny authorization of one or more in-network transactions. As an example, transaction service provider system 108 may, in response to determining that the out-of-network transaction and the in-network transaction are fraudulent transactions, deny authorization of the in-network transaction processed in transaction processing network 101.

In some non-limiting embodiments or aspects, transaction service provider system 108 may analyze out-of-network transactions, capture fraud patterns based thereon, and apply the captured fraud patterns to processing in-network transactions in transaction processing network 101, which may enhance a fraud detection capability of transaction service provider system 108 to be more effective in determining fraudulent in-network transactions.

As shown in FIG. 3, at step 312, process 300 includes providing notification to an issuer system associated with one or more out-of-network transactions. For example, transaction service provider system 108 may provide notification to an issuer system associated with one or more out-of-network transactions. As an example, transaction service provider system 108 may, in response to determining that the out-of-network transaction and the in-network transaction are fraudulent transactions, provide a notification to an issuer system associated with the out-of-network transaction. In such an example, the notification may include an indication that the out-of-network transaction is a fraudulent transaction and/or suggested fraud rules based thereon. For example, transaction service provider system 108 may send fraud/potential fraud information to an issuer system associated with transactions processed outside transaction processing network 101 that have enrolled or registered for such service, which may include suggested fraud rules based on transactions and fraud patterns analyzed by transaction service provider system 108. Accordingly, non-limiting embodiments or aspects may help issuers/organizations and/or cardholders to be aware of the potential or confirmed fraud transactions.

Referring now to FIGS. 4A-4G, FIGS. 4A-4G are diagrams of an overview of a non-limiting embodiment or aspect of an implementation 400 relating to a process for fraud detection. As shown in FIGS. 4A-4G, implementation 400 includes transaction processing network 401, transaction service provider system 408, and out-of-network issuer system 416. In some non-limiting embodiments or aspects, transaction processing network 401 can be the same or similar to transaction processing network 101. In some non-limiting embodiments or aspects, transaction service provider system 408 can be the same or similar to transaction service provider system 108. In some non-limiting embodiments or aspects, out-of-network issuer system 416 can be the same or similar to out-of-network system 116.

As shown by reference number 420 in FIG. 4A, transaction service provider system 408 may receive in-network transaction data associated with an in-network transaction processed in transaction processing network 401.

As shown by reference number 425 in FIG. 4B, transaction service provider system 408 may receive out-of-network transaction data associated with an out-of-network transaction processed outside of transaction processing network 401. In such an example, the in-network transaction and the out-of-network transaction may be consecutive transactions associated with a same account identifier.

Figure 4C:

As shown by reference number 430 in FIG. 4C, transaction service provider system 408 may determine, based on the in-network transaction data and the out-of-network transaction data, that each of the in-network transaction and the out-of-network transaction associated with the same account identifier include a value for a same at least one transaction parameter.

As shown by reference number 435 in FIG. 4D, transaction service provider system 408 may, in response to determining that each of the in-network transaction and the out-of-network transaction include the value for the same at least one transaction parameter, determine, a difference between the value for the at least one transaction parameter associated with the in-network transaction and the value for the at least one transaction parameter associated with the out-of-network transaction.

Figure 4E:
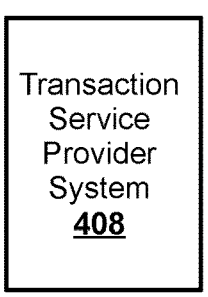
Figure 4E:

As shown by reference number 440 in FIG. 4E, transaction service provider system 408 may determine, based on the difference, whether the in-network transaction and the out-of-network transaction are fraudulent transactions.

Figure 4F:
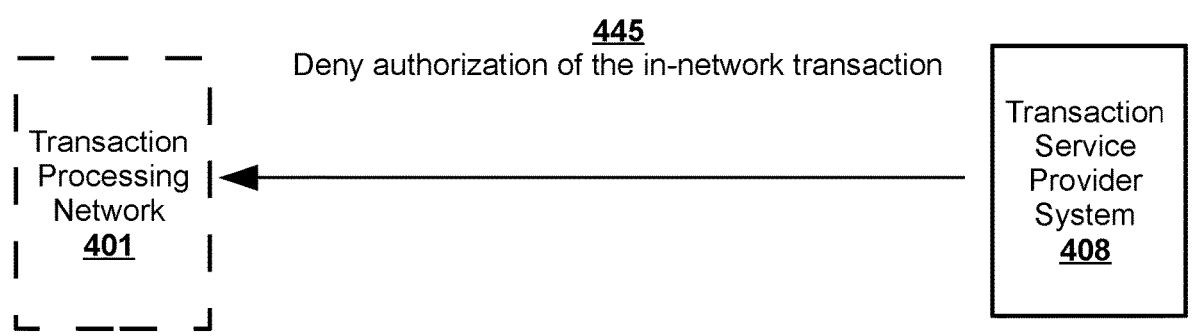

As shown by reference number 445 in FIG. 4F, transaction service provider system 408 may, in response to determining that the in-network transaction and the out-of-network transaction are fraudulent transactions, deny authorization of the in-network transaction processed in the transaction processing network 401.

Figure 4G:
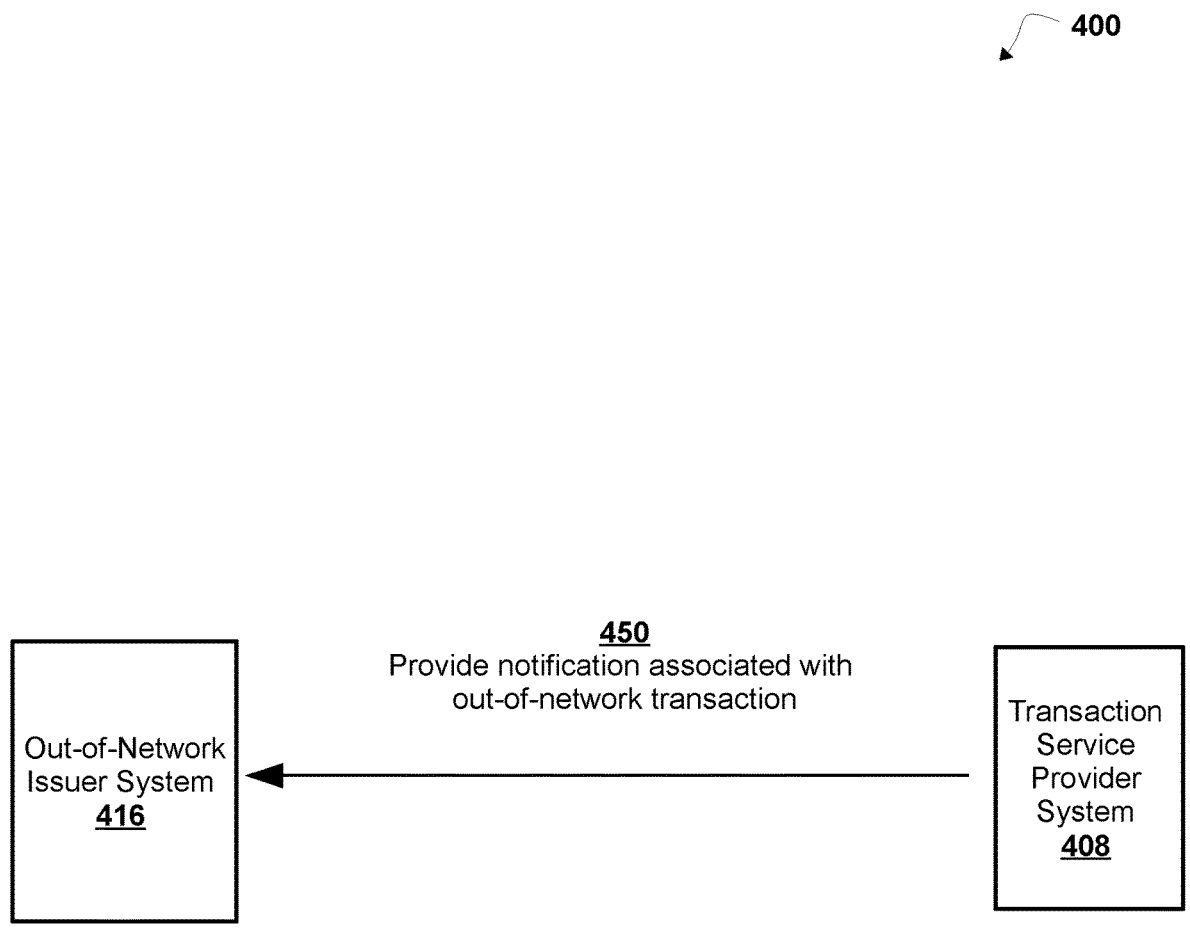

As shown by reference number 450 in FIG. 4G, transaction service provider system 408 may, in response to determining that the in-network transaction and the out-of-network transaction are fraudulent transactions, provide a notification to an issuer system associated with the out-of-network transaction. In such an example, the notification may include an indication that the out-of-network transaction is a fraudulent transaction.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
receiving, with at least one processor, from a transaction service provider system inside a communication path for processing at least one in-network transaction in a transaction processing network, during processing of the at least one in-network transaction processed in the transaction processing network, a real-time feed of in-network transaction data associated with the at least one in-network transaction;
receiving, with the at least one processor, from a Point-of-Sale device outside the communication path for processing the at least one in-network transaction in the transaction processing network, via a secure transfer channel outside the communication path, during processing of at least one out-of-network transaction processed outside of the transaction processing network, a real-time feed of out-of-network transaction data associated with the at least one out-of-network transaction;
processing, with the at least one processor, the real-time feed of the in-network transaction data in parallel with the real-time feed of the out-of-network transaction data to determine two or more consecutive transactions initiated consecutively in time with a same account identifier and including a first transaction including one of the at least one out-of-network transaction and the at least one in-network transaction and a second transaction including the other of the at least one out-of-network transaction and the at least one in-network transaction;
determining, with the at least one processor, whether each of the two or more consecutive transactions associated with the same account identifier include a value for a same at least one transaction parameter;
in response to determining that each of the two or more consecutive transactions associated with the same account identifier include the value for the same at least one transaction parameter, determining, with the at least one processor, a difference between the value for the at least one transaction parameter associated with the first transaction of the two or more consecutive transactions and the value for the at least one transaction parameter associated with the second transaction of the two or more consecutive transactions;
comparing, with the at least one processor, the difference to at least one threshold difference;
in response to determining that the difference satisfies the at least one threshold difference, determining, with the at least one processor, that the two or more consecutive transactions are fraudulent transactions; and
in response to determining that the two or more consecutive transactions including the at least one out-of-network transaction and the at least one in-network transaction are fraudulent transactions, denying, with the at least one processor, authorization of the at least one in-network transaction processed in the transaction processing network.

2. The computer-implemented method of claim 1, further comprising:
in response to determining that the two or more consecutive transactions including the at least one out-of-network transaction and the at least one in-network transaction are fraudulent transactions, providing, with at least one processor, a notification to an issuer system outside the communication path for processing the at least one in-network transaction in the transaction processing network and associated with the out-of-network transaction, wherein the notification includes an indication that the at least one out-of-network transaction is a fraudulent transaction.

3. The computer-implemented method of claim 1, wherein the at least one transaction parameter includes at least one of the following: a geographic location, a merchant category code (MCC), a transaction time, a transaction amount, or any combination thereof.

4. A computing system comprising:
one or more processors programmed and/or configured to:
receive, from a transaction service provider system inside a communication path for processing at least one in-network transaction in a transaction processing network, during processing of the at least one in-network transaction processed in the transaction processing network, a real-time feed of in-network transaction data associated with the at least one in-network transaction;

receive, from a Point-of-Sale device outside the communication path for processing the at least one in-network transaction in the transaction processing network, via a secure transfer channel outside the communication path, during processing of at least one out-of-network transaction processed outside of the transaction processing network, a real-time feed of out-of-network transaction data associated with the at least one out-of-network transaction;

process the real-time feed of the in-network transaction data in parallel with the real-time feed of the out-of-network transaction data to determine two or more consecutive transactions initiated consecutively in time with a same account identifier and including a first transaction including one of the at least one out-of-network transaction and the at least one in-network transaction and a second transaction including the other of the at least one out-of-network transaction and the at least one in-network transaction;

determine whether each of the two or more consecutive transactions associated with the same account identifier include a value for a same at least one transaction parameter;

in response to determining that each of the two or more consecutive transactions associated with the same account identifier include the value for the same at least one transaction parameter, determine a difference between the value for the at least one transaction parameter associated with the first transaction of the two or more consecutive transactions and the value for the at least one transaction parameter associated with the second transaction of the two or more consecutive transactions;

compare the difference to at least one threshold difference;

in response to determining that the difference satisfies the at least one threshold difference, determine that the two or more consecutive transactions are fraudulent transactions; and in response to determining that the two or more consecutive transactions including the at least one out-of-network transaction and the at least one in-network transaction are fraudulent transactions, deny authorization of the at least one in-network transaction processed in the transaction processing network.

5. The computing system of claim 4, wherein the one or more processors are further programmed and/or configured to:

in response to determining that the two or more consecutive transactions including the at least one out-of-network transaction and the at least one in-network transaction are fraudulent transactions, provide a notification to an issuer system outside the communication path for processing the at least one in-network transaction in the transaction processing network and associated with the at least one out-of-network transaction, wherein the notification includes an indication that the at least one out-of-network transaction is a fraudulent transaction.

6. The computing system of claim 4, wherein the at least one transaction parameter includes at least one of the following: a geographic location, a merchant category code (MCC), a transaction time, a transaction amount, or any combination thereof.

7. A computer program product comprising at least one non-transitory computer-readable medium including program instructions that, when executed by at least one processor, cause the at least one processor to:

receive, from a transaction service provider system inside a communication path for processing at least one in-network transaction in a transaction processing network, during processing of the at least one in-network transaction processed in the transaction processing network, a real-time feed of in-network transaction data associated with the at least one in-network transaction;

receive, from a Point-of-Sale device outside the communication path for processing the at least one in-network transaction in the transaction processing network, via a secure transfer channel outside the communication path, during processing of at least one out-of-network transaction processed outside of the transaction processing network, a real-time feed of out-of-network transaction data associated with the at least one out-of-network transaction;

process the real-time feed of the in-network transaction data in parallel with the real-time feed of the out-of-network transaction data to determine two or more consecutive transactions initiated consecutively in time with a same account identifier and including a first transaction including one of the at least one out-of-network transaction and the at least one in-network transaction and a second transaction including the other of the at least one out-of-network transaction and the at least one in-network transaction;

determine whether each of the two or more consecutive transactions associated with the same account identifier include a value for a same at least one transaction parameter;

in response to determining that each of the two or more consecutive transactions associated with the same account identifier include the value for the same at least one transaction parameter, determine a difference between the value for the at least one transaction parameter associated with the first transaction of the two or more consecutive transactions and the value for the at least one transaction parameter associated with the second transaction of the two or more consecutive transactions;

compare the difference to at least one threshold difference;

in response to determining that the difference satisfies the at least one threshold difference, determine that the two or more consecutive transactions are fraudulent transactions; and in response to determining that the two or more consecutive transactions including the at least one out-of-network transaction and the at least one in-network transaction are fraudulent transactions, deny authorization of the at least one in-network transaction processed in the transaction processing network.

8. The computer program product of claim 7, wherein the instructions further cause the at least one processor to:

in response to determining that the two or more consecutive transactions including the at least one out-of-network transaction and the at least one in-network transaction are fraudulent transactions, provide a notification to an issuer system outside the communication path for processing the at least one in-network transaction in the transaction processing network and associated with the at least one out-of-network transaction, wherein the notification includes an indication that the out-of-network transaction is a fraudulent transaction.

9. The computer program product of claim 7, wherein the at least one transaction parameter includes at least one of the following: a geographic location, a merchant category code (MCC), a transaction time, a transaction amount, or any combination thereof.

\* \* \* \* \*